Dec. 13, 1927.

A. P. BRUSH 1,652,757

BRAKE MECHANISM

Filed July 16, 1923

Inventor
Alanson P. Brush

By Whittemore Hulbert Whittemore Belknap.

Attorneys

Dec. 13, 1927.

A. P. BRUSH 1,652,757

BRAKE MECHANISM

Filed July 16, 1923

Inventor
Alanson P. Brush

Attorneys

Patented Dec. 13, 1927.

1,652,757

UNITED STATES PATENT OFFICE.

ALANSON P. BRUSH, OF DETROIT, MICHIGAN.

BRAKE MECHANISM.

Application filed July 16, 1923. Serial No. 651,869.

The invention relates to vehicle brake mechanisms and it is the primary object of the invention to obtain a simple and inexpensive construction. It is the further object to obtain certain advantages as hereinafter set forth.

In the present state of the art brake mechanisms are of two general types, in one of which a rigid brake shoe is moved radially into contact with the brake drum, while in the other a flexible brake band is moved circumferentially into contact with the drum. With the first type the arc of contact is less than 180°, while with the second type approximately 360° of contact is accomplished. Furthermore, with the second type the friction of the portions of the band initially contacting with the drum may cause, in the case of an external brake, a wrapping effect, or, in the case of an internal brake, an unwrapping effect which will assist in applying braking pressure, thereby reducing the amount of power required. On the other hand, with the first type the amount of movement required for setting the brakes or for compensating for wear is approximately one-sixth the amount required for the circumferential movement of the flexible band; also a simpler construction of operating mechanism can be employed.

My improved construction combines the advantages and eliminates the defects of both types above referred to. This is accomplished; first, by employing a band having a flexible portion which is movable by a wrapping or unwrapping movement into full contact with the drum; second, by actuating the band radially instead of circumferentially so as to reduce the amount of movement required; third, by providing a rigid segment which is directly actuated by the radial movement to contact with the drum and which prevents excessive wear at the point of application of said radial pressure. As a result a high braking torque may be obtained with a small initial force and a small movement of the pedal for taking up the initial clearance or that occasioned by wear.

Figure 1:
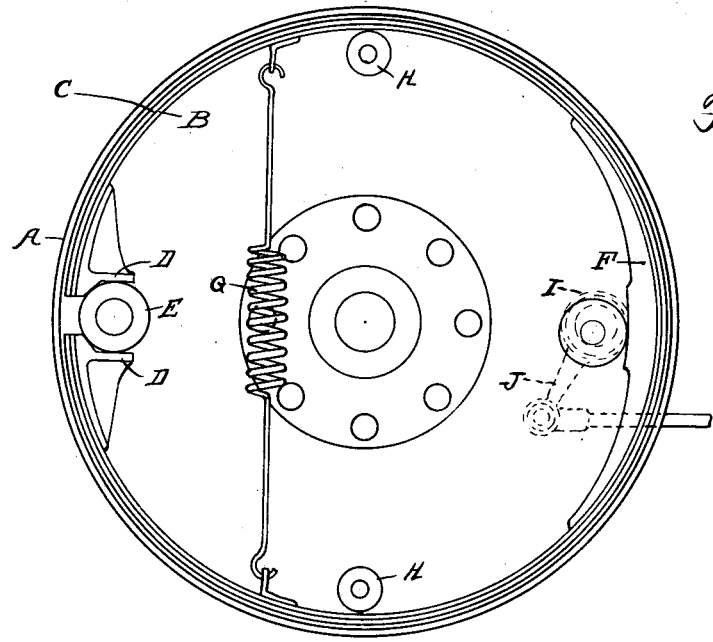
Figure 1 is a side elevation of a brake of my improved construction.

While my invention in its broader aspects is applicable to various constructions of brakes, I have specifically illustrated only its application to an internal brake. As shown in Figure 1, A is the brake drum, B the brake band having the usual lining C and provided at its opposite ends with flanges or shoulders D and D' for engaging a stationary abutment E. Diametrically opposite the abutment E the band is reinforced by a comparatively rigid segmental member F, which as shown is approximately 90°. To apply the brake the member F is moved radially towards the drum A and the friction produced by contact with the drum will cause a circumferential movement of the band which is resisted at one end by the shoulder D or D', according to the direction of rotation of the drum. As a consequence, an outward radial pressure is developed in each portion of the band between the abutment and the further end of the rigid section, which will produce a smooth braking effect and will uniformly distribute the wear. The function of the rigid section F is to avoid localizing the wear due to the initial frictional engagement and to distribute this wear uniformly over the whole extent of the rigid segment. Furthermore, by reason of this rigid segment, approximately 125° of the surface of the band is brought into action.

Figure 2:
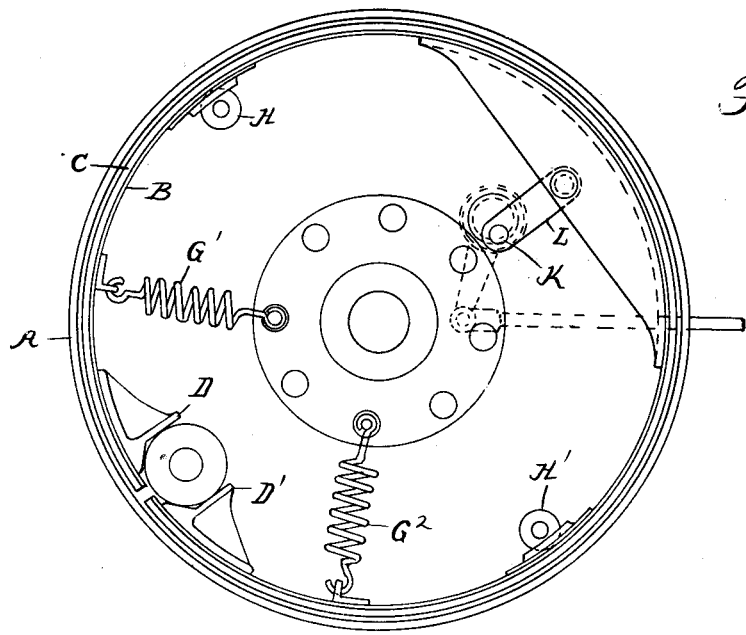
Figure 2 is a similar view slightly modified.

For releasing the band and for holding the same normally out of contact with the drum, there is provided a suitable retracting spring, such as G, and guides, such as H. The radial pressure upon the member F may be applied by any suitable means, such as the eccentric I operated by a rock arm J, as indicated in Figure 1, or by the crank K and link L, as indicated in Figure 2. With the latter construction two retracting springs G' and G² are shown.

Figure 4:
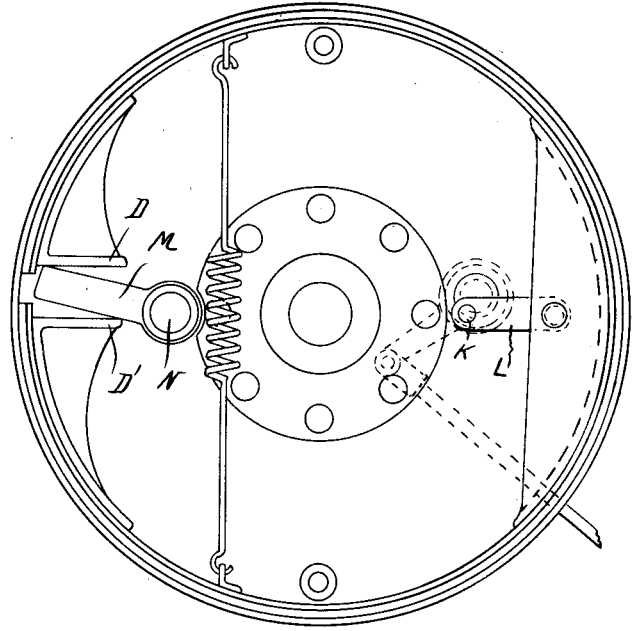
Figure 4 is a view similar to Fig. 2 of still another modification.
Figure 3:
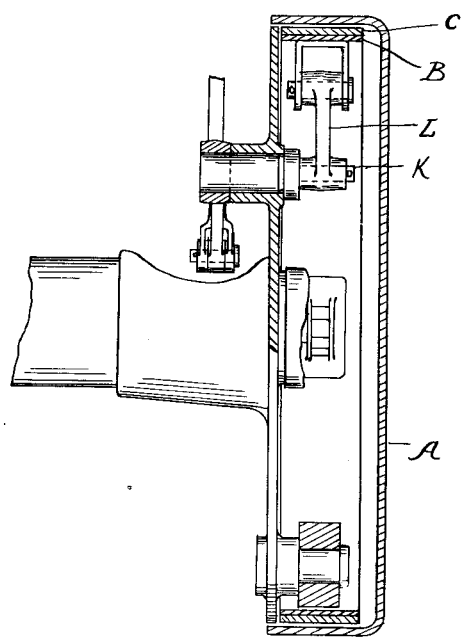
Figure 3 is a cross section of the construction shown in Figure 2.

The construction shown in Figure 4 is similar to that shown in Figures 1 and 2 with the exception that a rockable stop M is substituted for the rigid stop E. As shown, this stop M is pivotally mounted at N and extends between the end shoulders D and D' at the ends of the brake band. With this construction, when torque is developed in the band by the initial frictional engagement of the rigid portion, the whole band will rotate moving with it the member M. This member will, however, operate as a lever of the third class, which by its changing angularity will enlarge the space between the abutments D and D' and will develop outward radial pressure in the whole of the band. Thus the added advantage is obtained of bringing the entire band into action during either direction of rotation of the drum.

What I claim as my invention is:

1. The combination with a brake drum, of a flexible brake band adjacent thereto, an abutment for one end of said band, means for directly applying outward radial pressure to a point in said band spaced from said abutment point while permitting circumferential movement of the band between said points, whereby the initial friction will develop in said band radial pressure against the drum at all points between said abutment and pressure applying point.

2. The combination with a brake drum, of a flexible brake band adjacent thereto, an abutment for one point in said band, a rigid segment in said band spaced from said abutment point, and means for directly applying outward radial pressure to said rigid segment while permitting freedom for circumferential movement, for the purpose described.

3. The combination with a brake drum, of a flexible split brake band adjacent thereto, torque-taking means for the ends of said split band, and means for directly applying outward radial pressure to said band at a point intermediate the ends thereof while permitting free circumferential movement in either direction, for the purpose described.

4. The combination with a brake drum, of a flexible split brake band adjacent thereto, torque-taking means for the ends of said band at one point therein, a rigid segment in said band intermediate the ends thereof, and means for directly applying outward radial pressure to said segment while permitting free circumferential movement thereof in either direction.

5. The combination with a brake drum, of a flexible internal split brake band therein, an abutment arranged between the ends of said band, a rigid segment in said band intermediate the ends thereof, and means for directly applying outward radial pressure to said rigid segment, for the purpose described.

6. The combination with a brake drum, of a flexible internal split brake band therein, an abutment between the ends of said band, a rigid segment in said band intermediate the ends thereof, and means for applying outward radial pressure to said rigid segment comprising a crank and link, permitting free circumferential movement in either direction.

7. The combination with a brake drum, of a split flexible brake band adjacent thereto, an abutment between the ends of said band, a rigid segment in said band intermediate the ends thereof, means for directly applying radial pressure to said rigid segment while permitting free circumferential movement thereof, and means actuated by the circumferential movement of the band for relatively moving the ends thereof, whereby radial pressure is developed in all portions of the band.

8. The combination with a brake drum, of a split flexible brake band therein, a rigid segment in said band intermediate the ends thereof, means for directly applying radial pressure to said segment, permitting free circumferential movement thereof, and a rockable abutment member between the ends of said band actuated by the circumferential movement thereof to spread said ends and to develop radial pressure in all portions of the band.

9. The combination with a brake drum, of a flexible split brake band adjacent thereto, torque-taking means for the ends of said split band, means for directly applying outward radial pressure to said band at a point intermediate the ends thereof while permitting free circumferential movement in either direction, and guiding means for said flexible brake band intermediate said torque-taking means and pressure applying means.

10. The combination with a brake drum, of a flexible split brake band adjacent thereto, torque-taking means for the ends of said split band, a rigid segment in said band intermediate the ends thereof, guiding means for said band between said torque-taking means and said rigid segment, means for directly applying outward radial pressure to said rigid segment while permitting freedom for circumferential movement, and resilient retracting means connected to said band.

11. The combination with a brake drum, of a flexible internal split brake band therein, an abutment arranged between the ends of said band, a rigid segment on said band intermediate the ends thereof, guiding means intermediate said abutment and said rigid segment for holding said flexible brake band adjacent said brake drum, and means for directly applying outward radial pressure to said rigid segment.

12. The combination with a brake drum, of a flexible internal split brake band therein, an abutment between the ends of said band, a rigid segment in said band intermediate the ends thereof, guiding means between the ends of said band and said rigid segment for holding said flexible band adjacent said brake drum, means for applying outward radial pressure to said rigid segment, and resilient retracting means connected to said brake band and arranged to normally urge said flexible brake band inwardly from said brake drum.

In testimony whereof I affix my signature.

ALANSON P. BRUSH.